United States Patent [19]

Combû

[11] Patent Number: 4,767,087
[45] Date of Patent: Aug. 30, 1988

[54] PIPE CLAMP FOR THE ROCKING OR RIGID SUSPENSION OF PIPES

[76] Inventor: Hubert Combû, Lankwitzer Str. 39, D-1000 Berlin 42, Fed. Rep. of Germany

[21] Appl. No.: 65,845

[22] Filed: Jun. 22, 1987

[30] Foreign Application Priority Data

Jun. 24, 1986 [DE] Fed. Rep. of Germany ....... 3621484

[51] Int. Cl.$^4$ ............................................. F16L 27/02
[52] U.S. Cl. ......................................... 248/62; 248/324
[58] Field of Search ............... 248/60, 62, 70, 288.1, 248/288.3, 299, 324; 24/284

[56] References Cited

U.S. PATENT DOCUMENTS

| | | | |
|---|---|---|---|
| 422,945 | 3/1890 | Jones | 248/62 |
| 485,033 | 10/1892 | Hanna | 248/62 |
| 508,914 | 11/1893 | Cain | 248/62 |
| 515,922 | 3/1894 | O'Brien | 248/62 |
| 524,603 | 8/1894 | McIlvrid | 248/62 |
| 552,986 | 1/1896 | Carll | 248/62 |
| 649,270 | 5/1900 | Collins . | |
| 680,609 | 8/1901 | Marquardt | 248/62 |
| 801,409 | 10/1905 | Smith | 248/62 |
| 840,337 | 1/1907 | Johnson | 248/62 |
| 1,477,549 | 12/1923 | Eckert | 248/60 |
| 2,466,247 | 4/1949 | Land | 248/62 |
| 2,780,429 | 2/1987 | Vanier | 248/59 |
| 2,996,274 | 8/1961 | Marik et al. | 248/62 |
| 3,851,979 | 12/1974 | Becker | 248/62 |
| 4,407,479 | 10/1983 | Combe | 248/59 |

FOREIGN PATENT DOCUMENTS

| | | | |
|---|---|---|---|
| 786120 | 4/1935 | France | 248/62 |
| 141910 | 9/1953 | Sweden | 248/317 |

Primary Examiner—J. Franklin Foss
Assistant Examiner—Robert A. Olson
Attorney, Agent, or Firm—Thomas Schneck

[57] ABSTRACT

A pipe clamp for rocking or rigid suspension of pipes, which comprises two half-clamps having clamp lugs used for joining the half-clamps and having a connector for receiving a threaded rod. The connector is constructed in bridge-like manner and is fixed to the rounded portion of one half-clamp. The bridge-like connector includes a web with a through-bore. The rod is passed through the bore and secured by an internally threaded nut arranged in non-twisting manner in the bridge-like connector. Either the surface of the connector web facing the rounded portion of the half-clamp or one end face of the nut is arcuate, while the other is preferably planar.

7 Claims, 3 Drawing Sheets ers, so that storage costs are low, because there is no need to store different pipe clamps.

PIPE CLAMP FOR THE ROCKING OR RIGID SUSPENSION OF PIPES

TECHNICAL FIELD

The invention relates to a pipe clamp or clip for the suspension of pipes.

BACKGROUND ART

U.S. Pat. No. 4,407,479 to Combe discloses a pipe clamp suitable for both a rigid and a rocking suspension of pipes. Between the clamp lugs of two half-clamps is a connector, which is centrally provided with a threaded bore for receiving a threaded rod. The lateral end faces of the connector have oppositely projecting threaded bolts, which can be fixed by means of nuts to the clamp lugs. Both the lateral end faces of the connector and the internal faces of the clamp lugs have tooth systems which are arranged around the axis of the threaded bolts or the clamp lug screw holes, respectively. The tooth systems of the two annular lateral end faces of the connector and the corresponding tooth surfaces in the clamp lugs mesh with one another in one fitting position, so that the connector is rigidly connected to the clamp lugs. However, in the reversed fitting position the tooth faces are superimposed, so that the connector can be twisted with respect to the clamp lugs. Thus, in use of the pipe clamp the connector or connecting piece is positioned between the clamp lugs. That is, in fitting the pipeline, one half-clamp is vertically arranged and then the pipeline must be inserted laterally, whereafter the second half-clamp can be closed. However, in practice, a different fitting is often desirable, wherein the half-clamp is positioned horizontally and the pipe is pressed from below into the half-clamp after which the clamp is closed laterally at the lugs. With such a horizontal fitting position the connector must be fixed to the rounded portion in the center of the half-clamp.

Such clamps are known and have as the connector a welded or integral nut or sleeve, or alternatively steel tips or threaded bolts. These known pipe clamps with the connecting piece on the rounded portion in the center of the half-clamp can, however, only be used for rigid suspensions of the pipes.

The object of the present invention is to provide a pipe clamp satisfying the practical requirements with respect to the horizontal fitting position and being suitable for either a rigid or a rocking/swinging suspension of a pipeline.

DISCLOSURE OF THE INVENTION

The above object has been met by a bridge-like connector on the rounded portion of one of two half-clamps of a pipe clamp, the connector having a web with a bore for the passage of a threaded rod onto which is screwed a nut in non-twisting manner. Either the surface of the web of the connector facing the rounded portion of the half-clamp or one end face of the nut is arcuate while the other is planar. Thus, a pipe clamp is made available which can be used both in a rigid and a rocking connection. The connecting piece is simply and therefore inexpensively constructed and satisfies the practical need for fitting the pipes from below. The clamp is universally usable and employment of different thread standards leads to no problem. Consequently, storage costs are low, because there is no need to store different pipe clamps.

The protection against undesired twisting of the nut in the connector is achieved in that the connector comprises a U-shaped or bridge-like bent flat stock or material, with the inside width of the connector roughly corresponding to the nut width, so that the nut is held in non-twisting manner by the legs of the bridge-like connector.

The rigid connection between rod and connector or pipe clamp is advantageously improved in that the nut optionally has a rim or cone, which engages with the through-bore in the connector web. Another possibility of fixing the threaded rod to ensure a rigid connection comprises constructing the connector in a C-shaped manner, the ends resting on the half-clamp and the gap between the ends being less than the diameter of the rod with arcuate recesses provided centrally in the ends for receipt of the rod.

BEST MODE FOR CARRYING OUT THE INVENTION

Figure 1:
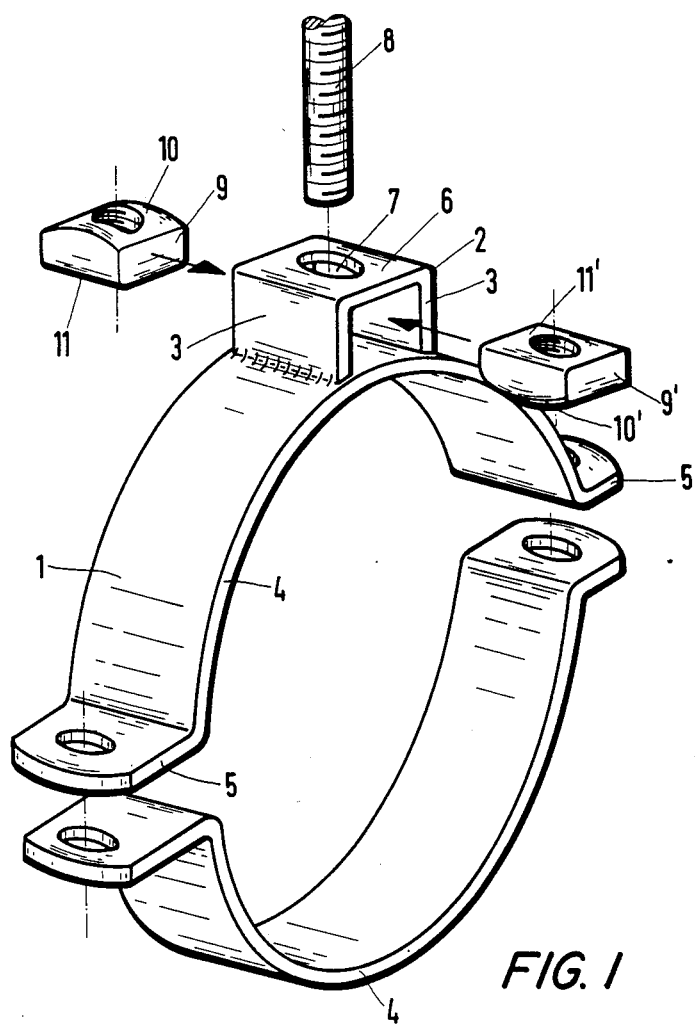
FIG. 1 is an exploded perspective view of a first embodiment of the pipe clamp in accord with the present invention.

FIG. 1 shows a pipe clamp 1 with connector 2 constructed in bridge-like manner and formed from a U-shaped bent flat stock. Legs 3 of the U-shaped connector 2 are welded to the rounded portion of a half-clamp 4 midway between the lugs 5 thereof. Pipe clamp 1 and connector 2 are made from steel.

In a web 6, the connector 2 is provided with a bore 7, through which is passed a threaded rod 8. For connecting threaded rod 8 to connector 2 a nut 9 is provided. One end face 10 of the nut 9 is convex and the opposite end face 11 is planar. The width of nut 9 and the inside width of connector 2 are so matched to one another than on screwing in the threaded rod 8, the nut cannot twist and is secured by the legs 3 of connector 2. Optionally, nut 9 can be constructed as a self-retaining nut.

Because of the special construction of nut 9, the versatility of the pipe clamp 1 is enhanced. That is, through the provision of a convex end face 10 and a planar end face 11, either a rigid or a rocking suspension of pipe clamp 1 is possible. In the case of the rocking or swinging connection, nut 9 is fitted in the position shown to the left, i.e., the convex end face 10 faces web 6 of connector 2. The arcuate construction of the nut is aligned parallel to the tangential direction of pipe clamp 1, so that the clamp 1 can roughly rock or swing about its axis. Threaded rod 8 is not screwed down to the surface of half-clamp 4, so that the cylindrical end face 10 can roll on the smooth lower surface of web 6 of connector 2. This is important, because without the rounded surface the nut would bear too far away from the axis of the threaded rod 8 during a rocking movement, which would lead to static problems.

In the case of a rigid connection between threaded rod 8 and connector 2 or pipe clamp 1, as shown in the right-hand part of the drawing, nut 9' is inserted with the planar surface 11' upwards in connector 2 and the threaded rod is screwed down to the surface of half-clamp 4. Planar end face 11' then bears on the face of web 6, so that the necessary rigidity of the connection is ensured.

Figure 2:
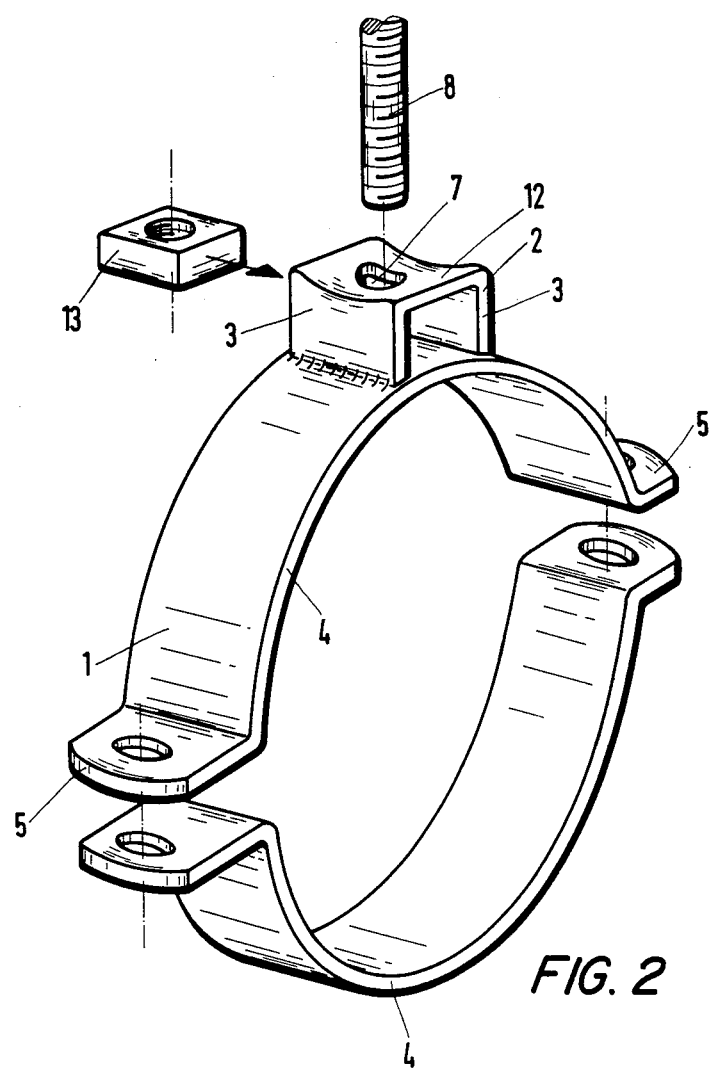
FIG. 2 is an exploded view of a second embodiment in which the connector web is constructed in groove-like manner.

FIG. 2 shows an embodiment in which a special nut is not required. Duplicate parts are given the same reference numerals as in FIG. 1. Connector 2 is attached in the same way to half-clamp 4 and is constructed in a U-shaped manner. However, in the embodiment of FIG. 2 web 12 of the connector is convex relative to the arc of the half-clamp 4, with the arc of the web 12 of connector 2 being perpendicular to the arc of the half-clamp. Nut 13 can be constructed as a normal square or hexagonal nut.

For rocking suspension, threaded rod 8 is not screwed down to the surface of half-clamp 4, so that the planar face of nut 13 can roll on the rounded face of web 12 of connector 2 for a rocking movement corresponding to that obtained with the embodiment of FIG. 1.

Figure 4A:
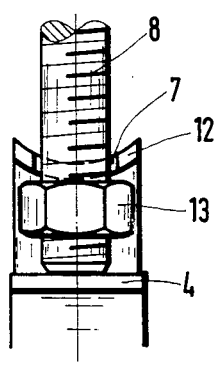
FIGS. 4A–4C are side views of a rigid connection between the threaded rod and cylindrical groove-like connector of FIG. 2.
Figure 4B:
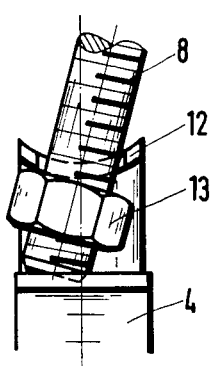
Figure 4C:
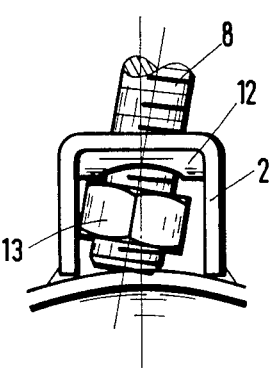

For a rigid connection, the threaded rod 8 is screwed, in accordance with the first embodiment, down to the surface of half-shell 4, as is shown in FIG. 4A. The planar end of the threaded rod 8, cut off vertically to its central axis will rest firmly on the rounded portion of half-clamp 4. Thereafter, a sliding or slipping of this bearing point is, as shown by FIGS. 4B and 4C, only possible if the clamp is deformed by nut 13 pressing the threaded rod 8 ever deeper into the surface of the half-clamp.

Figure 3:
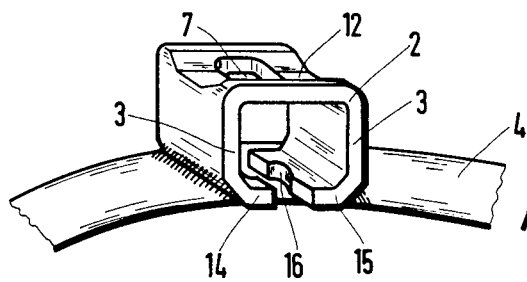
FIG. 3 is a perspective view of a third embodiment having a C-shaped connector for the pipe clamp.

Connector 2 according to FIG. 3 serves to improve the rigid connection, particularly in the case of a rounded web 12. Connector 2 is C-shaped in cross-section, with ends 14, 15 of the C-shape at least partly bearing on the surface of half-clamp 4. At the transition between leg 3 and ends 14, 15 is applied a weld for joining the connector 2 to half-clamp 4. Ends 14, 15 can also be curved corresponding to the curved portion of half-clamp 4. The spacing of the facing ends 14, 15 is smaller than the diameter of threaded rod 8 and arcuate recesses 16 are provided centrally in ends 14, 15 below bore 7. In the case of a rigid connection, the threaded rod engages the arcuate recesses 16 and is consequently secured.

Figure 5:
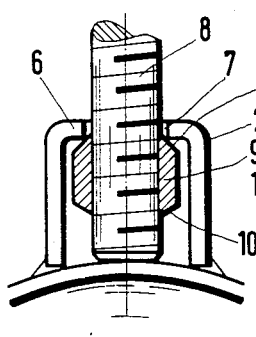
FIG. 5 is a side view of a rigid connection between the pipe clamp and threaded rod of FIG. 2, the nut used having a rim or cone engaging in the bore.

FIG. 5 shows another possibility for improving the rigid connection between connector 2 and threaded rod 8, in which on a face opposite to the cylindrical face 10, nut 9 is provided with a rim or cone 17 configuration which engages through-bore 7 and at least partly fills the space between threaded rod 8 and web 6. Like the other nuts used, nut 9 can be constructed as a cold pressed steel part. This manner of fixing nut 9 in through-bore 7 can obviously also be used in the case of a rounded web 12 shown in FIG. 2.

Figure 6A:
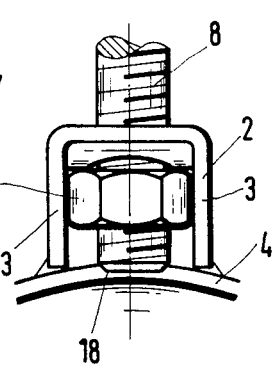
FIGS. 6A–6B show side views of a further embodiment, in which the half-clamp has a depression.
Figure 6B:
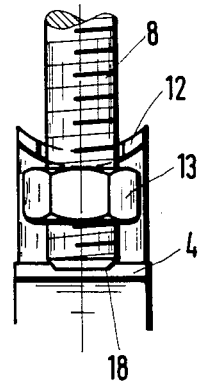

FIGS. 6A and 6B show another embodiment, generally corresponding to that of FIG. 2 but with a depression 18 provided in half-clamp 4. The depression 18 has a diameter correspoonding to that of threaded rod 8. For a rocking suspension, the threaded rod is not fastened down to the surface of half-clamp 4. However, for a rigid connection the threaded rod 8 is screwed into the depression. The dimensions of nut 13 and connector 2 are chosen in such a way that nut 13 can twist and engage on the legs 3 of connector 2. If forces occur which would press the threaded rod 8 out of its position, they are absorbed both by the depression 18 and by the legs 2 on which nut 13 engages, so that a displacement is not possible.

What is claimed is:

1. A pipe clamp for rocking or rigid suspension of pipes comprising first and second half-clamps and an internally threaded nut, each half-clamp having clamp lugs for joining together said half-clamps and having a rounded portion, said first half-clamp having a bridge-like connector for receiving a threaded rod, said bridge-like connector having a web, and having spaced apart legs connected to the rounded portion of the first half-clamp for supporting said web in a spaced apart relation to said rounded portion, said web having a bore through which the threaded rod may be passed, said nut having a dimension matching a connector dimension between said spaced apart legs, thereby locking the nut in the connector and establishing a non-twisting pipe suspension relation between said web and the rounded portion of the first half-clamp, said nut having a first contact face and said web having an interface surface, one of said first contact face and said interface surface being arcuate for allowing relative rocking motion between said first compact face and said interface surface in one configuration, with said nut, rod and connector having a second configuration precluding rocking motion.

2. A pipe clamp according to claim 1 wherein the arcuate surface of said first contact face and said interface surface is positioned parallel to the tangential direction of the pipe clamp.

3. A pipe clamp according to claim 1 wherein the nut has a second contact face, said second contact face being planar.

4. A pipe clamp for rocking or rigid suspension of pipes comprising first and second half-clamps and an internally threaded nut, each half-clamp having clamp lugs for joining together said half-clamps and having a rounded portion, said first half-clamp having a bridge-like connector for receiving a threaded rod, said bridge-like connector having a web and having means connected to the rounded portion of the first half-clamp for supporting said web in a spaced apart relation to said rounded portion, said web having a bore through which the threaded rod may be passed, said nut arranged in non-twisting manner between said web and the rounded portion of the first half-clamp, said nut having a first contact face and said web having an interface surface, one of said first contact face and said interface surface being arcuate, wherein the bridgelike connector has a configuration having opposed inwardly extending ends engaging said first half-clamp, said ends being spaced apart by a distance less than the diameter of the threaded rod, said ends having arcuate recesses being provided centrally for fixing the rod.

5. A pipe clamp for rocking or rigid suspension of pipes comprising first and second half-clamps and an internally threaded nut, each half-clamp having clamp lugs for joining together said half-clamps and having a rounded portion, said first half-clamp having a bridge-like connector for receiving a threaded rod, said bridge-like connector having a web and having means connected to the rounded portion of the first half-clamp for supporting said web in a spaced apart relation to said rounded portion, said web having a bore through which the threaded rod may be passed, said nut arranged in non-twisting manner between said web and the rounded portion of the first half-clamp, said nut having a first contact face and said web having an interface surface, one of said first contact face and said interface surface being arcuate, wherein the first half-clamp below the bore or the connector has a depression with a diameter corresponding to that of the threaded rod.

6. A pipe clamp for suspension of pipes comprising, a first half-clamp and a second half-clamp, each having a rounded portion, means for fixing said first half-clamp to said second half-clamp, a connector having a web portion and having means for supporting said web portion in spaced apart relation to said rounded portion of the first half-clamp to form a gap, said web portion having a bore, an internally threaded nut disposed within said gap, said nut having a first contact face and said web portion of the connector having an interface surface adjacent to said first half-clamp, one of said first contact face and said interface surface being arcuate and the other being substantially planar, and an externally threaded rod projecting through said bore of the web portion for securement to said internally threaded nut, wherein said connector has opposed inwardly extending end portions spaced apart by a distance less than the diameter of the externally threaded rod, said end portions each having an arcuate recess disposed to receive said rod.

7. A pipe clamp for suspension of pipes comprising, an arcuate clamp member, a connector having a web portion and having legs disposed to support said web portion to said arcuate clamp member, said web portion being spaced apart from said arcuate clamp member to define a gap, said web portion having a bore, an internally threaded nut disposed within said gap, said nut having a first contact face and said web portion of the connector having an interface surface contacting said first contact surface of the nut, at least one of said interface surface and said first contact surface being arcuate for rolling engagement of said connector with said nut, and an externally threaded rod projecting through said bore of the web portion for engagement with said internally threaded nut, wherein said connector has opposed inwardly extending end portions spaced apart by a distance less than the diameter of the externally threaded rod, said end portions each having an arcuate recess disposed to receive said rod.

* * * * *

UNITED STATES PATENT AND TRADEMARK OFFICE
CERTIFICATE OF CORRECTION

PATENT NO. : 4,767,087
DATED      : August 30, 1988
INVENTOR(S) : Hubert Combé

It is certified that error appears in the above—identified patent and that said Letters Patent is hereby corrected as shown below:

On the cover page, under "UNITED STATES PATENT [19]", "Combû" should read -- Combé --.

On the cover page, column 1, [76], Inventor:, "Hubert Combû" should read -- Hubert Combé --.

Signed and Sealed this

Seventeenth Day of October, 1989

Attest:

DONALD J. QUIGG

Attesting Officer

Commissioner of Patents and Trademarks